No. 750,133. PATENTED JAN. 19, 1904.
C. B. TRESCOTT.
PLANT FOR CURING FOOD PRODUCTS.
APPLICATION FILED DEC. 29, 1900.
NO MODEL. 2 SHEETS—SHEET 2.
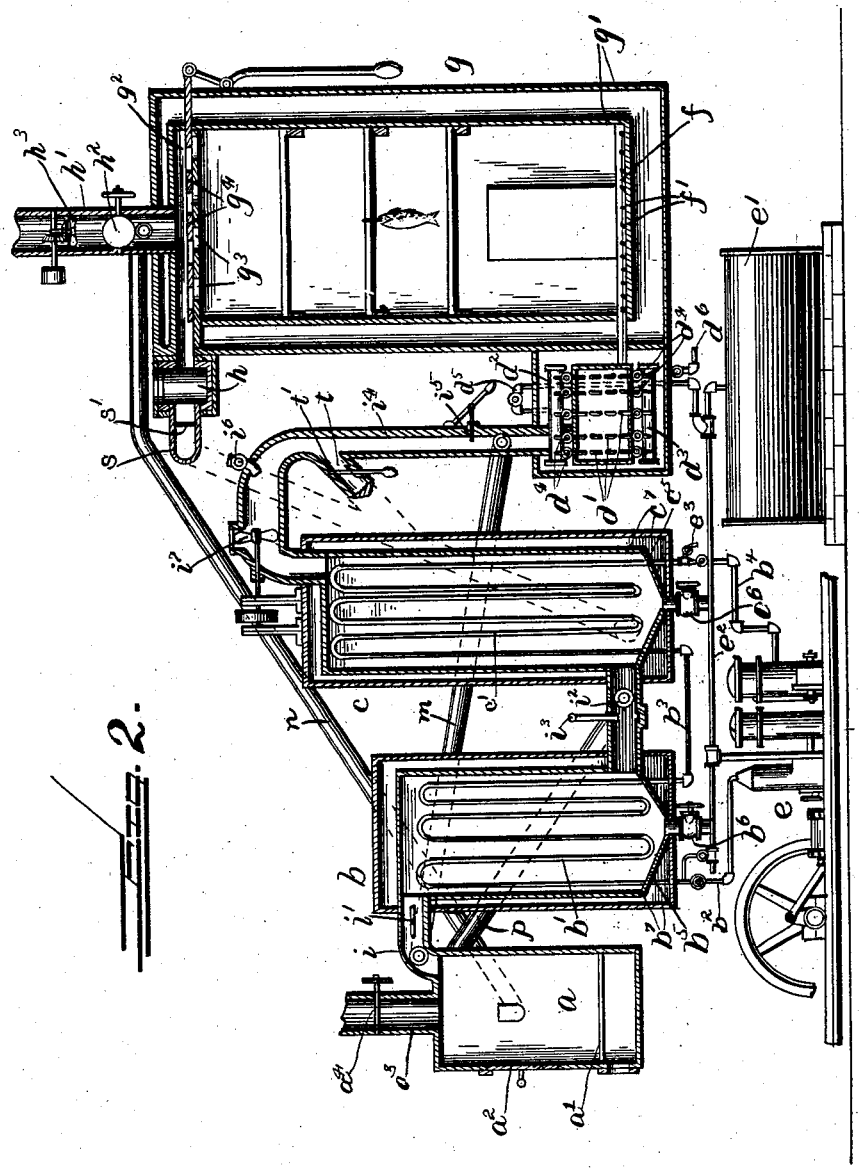
WITNESSES
Eugene M. Sliney.
C. C. Cousins.
INVENTOR:
Charles B. Trescott,
by R. S. Dyrenforth,
his attorney No. 750,133. Patented January 19, 1904.

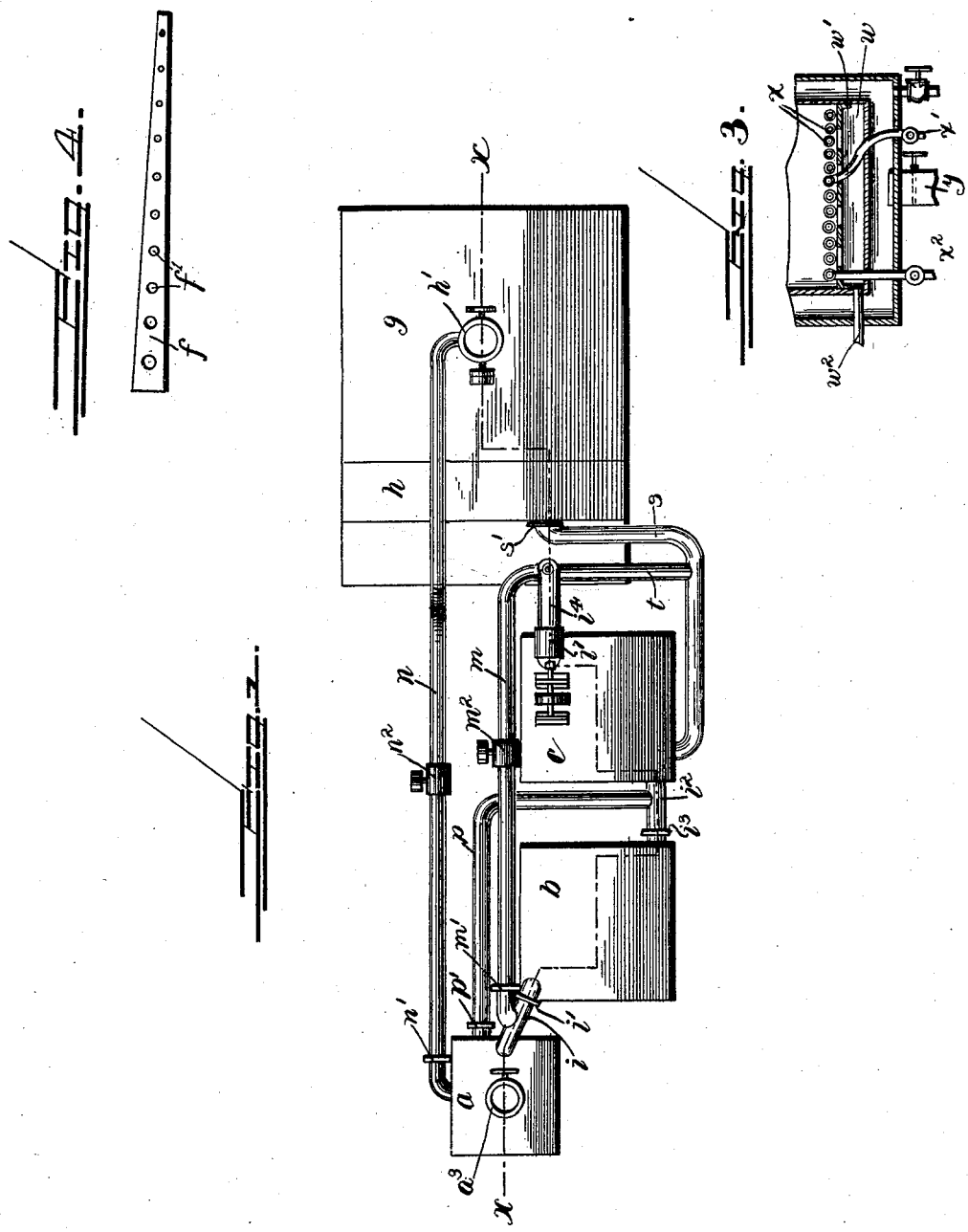

UNITED STATES PATENT OFFICE.

CHARLES B. TRESCOTT, OF PORTLAND, OREGON.

PLANT FOR CURING FOOD PRODUCTS.

SPECIFICATION forming part of Letters Patent No. 750,133, dated January 19, 1904.

Application filed December 29, 1900. Serial No. 41,516. (No model.)

*To all whom it may concern:*

Be it known that I, CHARLES B. TRESCOTT, a citizen of the United States, residing at Portland, in the county of Multnomah and State of Oregon, have invented certain new and useful Improvements in Curing Food Products, of which the following is a specification.

The object of my invention is to provide means whereby the temperature, dryness, and purity of the curing medium may be regulated and varied.

The main objectionable features existing in the smoke-curing of food products as at present practiced are: the uniformly high temperature occurring in the curing-chamber, which results in shrinkage, loss of essence, and deterioration in hot weather and in cold weather in scorching, leaving the interior moist, or in cooking the product; in curing oily fish the heat tries out the oil, leaving the fish dry and lacking in flavor; the presence in the curing medium of moisture, free carbon, and other substances, resulting in discoloration and deterioration of the food products; insufficient exposure of the food products to the curing medium, and waste of the curing medium by discharging it before fully utilizing its curative elements.

I have devised means whereby existing defects can be overcome and food products advantageously cured by properly varying the temperature, dryness, and purity of the curing medium, such variation depending upon the weather and the character of the food products. My improved apparatus also enables the curative action of the medium to be fully utilized.

To these ends my invention consists in the constructions, combinations, and arrangements hereinafter described and claimed.

In the drawings forming a part of this application, and in which similar reference-numerals indicate corresponding parts in the several views, Figure 1 is a plan view illustrating a construction in which the temperature, dryness, and purity of the curing medium can be regulated as desired and the curative action of the curing medium can be fully utilized. Fig. 2 is a sectional elevation on the line X X of Fig. 1, and Fig. 3 is a detail sectional view showing means located in the curing-chamber for heating the curing medium. Fig. 4 is a detail view, on a larger scale, showing the pipes leading from the reheater to the curing-chamber.

Referring to the drawings, $a$ indicates a smoke-generator provided with a grate $a'$, a charging-door $a^2$, and a stack $a^3$ in which is a damper $a^4$.

$b$ and $c$ indicate a plurality of coolers provided with pipe-coils $b'$ $c'$, which are connected by pipes $b^2$ $b^3$ $b^4$ with a refrigerator $e$ and by a pipe $e^2$ with a steam-boiler $e'$. The pipes $b^2$, $b^3$, $b^4$, and $e^2$ are shown properly supplied with valves for placing the pipe-coils in communication with either the refrigerator or the boiler. A valved exhaust-outlet $e^3$ is provided for the escape of steam when the coils are placed in communication with the boiler. The coolers are shown with double walls $b^7$ $c^7$ and with inclined bottom $b^5$ $c^5$, provided with valved drains $b^6$ $c^6$.

$d$ indicates a reheater having independent coils $d'$ $d'$ $d'$, each of said coils being connected at its respective ends with a feed-header $d^2$ and a discharge-header $d^3$. Each of the reheater-coils is provided with valves $d^4$ $d^4$, whereby any desired number of said coils may be cut out, and the feed and discharge headers are provided, respectively, with a valved steam-pipe $d^5$ and exhaust $d^6$.

$f$ indicates tapered pipes extending from the reheater to a curing-chamber $g$ and shown provided with graduated openings $f'$ to insure a uniform discharge along the perforated lengths of said pipes. The curing-chamber is shown with double walls $g'$ and having an upper compartment $g^2$, provided with ports $g^3$, controlled by valves $g^4$. The compartment $g^2$ is in open communication with both a cross-flue $h$ and a conveniently-located stack $h'$, the stack being provided with a damper $h^2$ and a pressure-changing device, such as a fan $h^3$.

A flue $i$, having a valve $i'$, connects the smoke-generator and the cooler $b$, a flue $i^2$, having a valve $i^3$, connects the coolers $b$ and $c$, and a flue $i^4$, having a valve $i^5$, connects the cooler $c$ with the reheater. These flues are preferably arranged at diametrically opposite parts of the several connected elements in order to insure the longest path for the curing medium flowing therethrough. The flue $i^4$ is provided with an adjustable vent $i^6$ and with a pressure-changing device, such as a fan $i^7$. Direct communication is provided between the smoke-generator and reheater by a flue $m$, having a valve $m'$ and pressure-changing device $m^2$, between the smoke-generator and the curing-chamber by a flue $n$, provided with a fan $n^2$ and valve $n'$, between the smoke-generator and the cooler $c$ by a flue $p$, having a valve $p'$, and between the cooler $c$ and the curing-chamber by a flue $s$, having a valve $s'$.

In the operation of my apparatus the fire is properly started in the smoke-generator and the valves $i'$, $i^3$, $i^5$, and $h^2$ opened, the remaining valves being closed. Under this arrangement the curing medium or preservative from the smoke-generator passes through the coolers $b$ $c$, where the moisture, being precipitated on the refrigerating-coils $b'$ $c'$, carries with it free carbon and other impurities. The resulting dried, purified, and practically colorless curing medium then passes into the reheater, where it is brought to the desired temperature. The curing medium passes from the reheater to the curing-chamber, and finally escapes through the adjustable ports $g^3$ to the stack $h'$.

If in the above operation it be desired to reuse the curing medium, the valve $h^2$ is closed and the valve $n'$ opened. At the same time the vent $i^6$ should be adjusted to permit escape of a certain portion of the curing medium which will be replaced from the smoke-generator, and thus prevent the curing medium from becoming exhausted or vitiated. Again, if it be desired to reuse only a portion of the curing medium the valve $h^2$ and $n'$ can each be arranged partially opened.

To cut out the cooler $b$, the valves $p'$, $b^5$, and $h^2$ are opened and the remaining valves closed.

The flue $s$ provides means for obtaining a circulation of the curing medium through the curing-chamber and the cooler $c$. In such operation the valves $i^5$ and $s'$ are opened and the remaining valves closed.

In the above-described modes of operation the proper pressure-changing devices $h^3$ $i^7$ $n^2$ can be employed for securing a suitable circulation under the operating conditions, as will be readily understood, in each case. Further, the several above-described modes of operation may be combined as found desirable.

A by-pass $t$, having an adjustable valve $t'$, is shown connecting the flues $i^4$ and $s$, and by properly adjusting the valve $t'$ a portion of the curing medium can be shunted from the flue $i^4$ and caused to again circulate through the cooler $c$ before passing to the curing-chamber.

To remove the moisture and impurities precipitated on the outside of the refrigerating-coils $b'$ $c'$, the valves in pipes $b^2$ $b^4$ are closed to cut out the refrigerator and steam admitted to said coils by opening the valves in pipe $e^2$ and exhaust $e^3$. The moisture and impurities may then be drained off through the drains $b^6$ $c^6$.

Fig. 3 illustrates a modification in which the outside reheater $d$ is omitted and the curing medium reheated in the curing-chamber. As shown, the curing medium enters through an inlet $w^2$ into a casing $w$ within the curing-chamber. The casing $w$ is provided with an apertured wall $w'$, through which the curing medium escapes into the curing-chamber. A heating-coil $x$ is positioned within the curing-chamber in the path of the entering curing medium and provided with valved inlet and outlet pipes $x'$ and $x^2$. A valved inlet $y$ for hot air or other heating medium is shown communicating with the space between the double walls of the curing-chamber. In this construction either or both of the heating means $x$ and $y$ may be employed.

From the foregoing description it will be readily understood that I have invented simple, conveniently-operated, and inexpensive means for overcoming the defects at present existing in the operation of curing food products, and, further, that in my construction the dryness, temperature, and purity of the curing medium can be regulated to meet all conditions occurring in practice.

Having thus described my invention, what I claim as new, and desire to secure by Letters Patent, is—

1. In a food-curing apparatus, and in combination with a communicating curing-chamber and source of curing medium, of refrigerating means arranged in said communication and adapted to precipitate moisture and impurities from the curing medium, a source of heat, and means arranged to connect said source of heat to the refrigerating means at will, whereby the precipitated moisture and impurities will be removed from said refrigerating means, substantially as described.

2. In a food-curing apparatus, and in combination with a communicating curing-chamber and source of curing medium, of refrigerating means arranged in said communication and adapted to precipitate moisture and impurities from the curing medium, a source of heat, means arranged to connect said source of heat to the refrigerating means at will, whereby the precipitated moisture and impurities will be removed from said refrigerating means, and means constructed to create a forced draft in the apparatus, substantially as described.

3. A food-curing plant, comprising a preservative-generator, a cooler arranged in communication therewith, a curing-chamber comcuring-chamber, and means constructed to cause a return circulation through said by-pass, substantially as described.

19. A food-curing plant, comprising a preservative-generator, a plurality of cooling-chambers, a reheater, and a curing-chamber, connected in communicating series by a plurality of flues, a pressure-changing device located in the flue connecting the last of said cooling-chambers and the reheater, and arranged to cause suction in the preservative-generator and cooling-chambers, and to create pressure in the reheater and curing-chamber, substantially as described.

20. A food-curing plant, comprising a preservative-generator, a cooler, and a curing-chamber, connected in communicating series by a plurality of flues, valves arranged in said flues, a by-pass connecting the cooler and the flue from said cooler to the curing-chamber, and means constructed to create circulation of the preservative, substantially as described.

21. A food-curing plant, comprising a preservative-generator, a cooler, and a curing-chamber, connected in communicating series by a plurality of flues, valves arranged in said flues, an adjustable by-pass connecting the cooler and the flue from said cooler to the curing-chamber, and means constructed to create circulation of the preservative, substantially as described.

22. A food-curing plant, comprising a preservative-generator, a cooler, and a curing-chamber, connected in communicating series by a plurality of flues, a return-flue connecting said curing-chamber and cooler, a by-pass connecting said return-flue with the inlet-flue to the curing-chamber, and means constructed to create circulation of the preservative, substantially as described.

23. A food-curing plant, comprising a preservative-generator, a cooler, and a curing-chamber, connected in communicating series by a plurality of flues, a return-flue connecting said curing-chamber and cooler, an adjustable by-pass connecting said return-flue with the inlet-flue to the curing-chamber, and means constructed to create circulation of the preservative, substantially as described.

24. A food-curing plant, comprising a preservative-generator, a cooler, and a curing-chamber, connected in communicating series by a plurality of flues, a return-flue connecting said curing-chamber and cooler, a by-pass connecting said return-flue with the inlet-flue to the curing-chamber, a valve positioned in said inlet-flue and arranged intermediary the mouth of said by-pass and the curing-chamber, and means constructed to create circulation of the preservative, substantially as described.

25. A food-curing plant, comprising a preservative-generator, a cooler, and a curing-chamber, connected in communicating series by a plurality of flues, a return-flue connecting said curing-chamber and cooler, a by-pass connecting said return-flue with the inlet-flue to the curing-chamber, a valve positioned in said inlet-flue and arranged intermediary the mouth of said by-pass and the curing-chamber, means constructed and arranged to heat the preservative, and means constructed to create circulation of the preservative, substantially as described.

26. A food-curing plant, comprising a preservative-generator, a cooler, and a curing-chamber, connected in communicating series by a plurality of flues, a return-flue connecting said curing-chamber and cooler, a by-pass connecting said return-flue with the inlet-flue to the curing-chamber, means constructed to permit escape of a portion of the preservative, and means constructed to create circulation of the preservative, substantially as described.

27. A food-curing plant, comprising a preservative-generator, a cooler, and a curing-chamber, connected in communicating series by a plurality of flues, a return-flue connecting said curing-chamber and cooler, means constructed to permit escape of a portion of the preservative, and means constructed and arranged to cause a continuous circulation of a portion of the preservative from the curing-chamber to the cooler and from the cooler to the curing-chamber mixed with fresh preservative, substantially as described.

28. A food-curing plant, comprising, in communicating series, a preservative-generator, a cooler, and a curing-chamber, and means constructed to raise the temperature of the preservative passing from said cooler, to raise the temperature in said curing-chamber, substantially as described.

29. A food-curing plant, comprising a preservative-generator, a plurality of cooling-chambers, a reheater, and a curing-chamber, connected in communicating series, flues connecting the preservative-generator, respectively, with the last of said cooling-chambers, the curing-chamber, and the reheater, valves in said flues, and means constructed to create circulation of the preservative, substantially as described.

30. A food-curing plant, comprising a preservative-generator, a plurality of cooling-chambers, a reheater, and a curing-chamber, connected in communicating series, flues connecting the preservative-generator, respectively, with the last of said cooling-chambers, the curing-chamber, and the reheater, valves in said flues, means constructed to permit escape of a portion of the preservative, and means constructed to create circulation of the preservative, substantially as described.

In testimony whereof I affix my signature in the presence of two subscribing witnesses.

CHARLES B. TRESCOTT.

Witnesses:
  WALTER G. DOWNING,
  GEO. A. WELLS.

municating with said cooler, means constructed to remove the collected impurities from said cooler, and means arranged to cause circulation of the preservative, substantially as described.

4. A food-curing plant, comprising a preservative-generator, a cooler, a reheater, a curing-chamber, all arranged in communication, and means arranged to create a forced draft through the plant, substantially as described.

5. A food-curing plant, comprising a preservative-generator, a cooler, a reheater, a curing-chamber, all arranged in communication, means arranged to create a forced draft through the plant, and means constructed to permit escape of the preservative, substantially as described.

6. A food-curing plant, comprising, in communicating series, a preservative-generator, a cooler, a reheater, and a curing-chamber, a flue arranged in direct communication with said generator and reheater, a pressure-changing device in said flue, and means arranged to cut out the cooler at will and thereby cause the preservative to pass directly from the generator to the reheater, substantially as described.

7. A food-curing plant, comprising, in communicating series, a preservative-generator, a cooler, and a curing-chamber, and means constructed to cause a continuous circulation of the preservative through the curing-chamber and cooler in cycle, substantially as described.

8. A food-curing plant, comprising, in communicating series, a preservative-generator, a cooler, a reheater, and a curing-chamber, and means constructed to cause continuous circulation of a portion of the preservative from the curing-chamber through the cooler and reheater, substantially as described.

9. A food-curing plant, comprising, in communicating series, a preservative-generator, a cooler, and a curing-chamber, means constructed to cause circulation of the preservative from the curing-chamber to the cooler, and means constructed to reheat the preservative issuing from the cooler and thereby raise the temperature in the curing-chamber, substantially as described.

10. A food-curing plant, comprising, in communicating series, a preservative-generator, a cooler, a reheater, and a curing-chamber, means constructed to regulate the heat of said heater, as required, means constructed to create circulation of the preservative throughout the plant, and a vent arranged to permit escape of a portion of the preservative, substantially as described.

11. A food-curing plant, comprising, in communicating series, a preservative-generator, a cooler, a reheater, and a curing-chamber, means constructed to regulate the heat of said heater, as required, means constructed to create circulation of the preservative throughout the plant, and an adjustable vent arranged to permit escape of a portion of the preservative, substantially as described.

12. A food-curing plant, comprising, in communicating series, a preservative-generator, a cooler, a reheater, and a curing-chamber, means constructed to regulate the heat of said heater, means constructed to create circulation of the preservative throughout the plant, a vent arranged to permit escape of a portion of the preservative, and means constructed to project the preservative uniformly within said curing-chamber, substantially as described.

13. A food-curing plant, comprising a preservative-generator, a cooler, a reheater, and a curing-chamber, connected in communicating series by a plurality of flues, means constructed to create circulation of the preservative throughout the plant, and valves located in the several flues and arranged to regulate the passage of the preservative to different parts of the plant, substantially as described.

14. A food-curing plant, comprising a preservative-generator, a cooler, a reheater, and a curing-chamber, connected in communicating series by a plurality of flues, means constructed to create circulation of the preservative, an adjustable vent arranged to permit escape of a portion of the preservative, valves located in said flues and arranged to regulate the passage of the preservative to the different parts of the plant, and means constructed to project the preservative within said curing-chamber in a multiple of jets, substantially as described.

15. A food-curing plant, comprising, in communicating series, a preservative-generator, a cooler, and a reheater, independent heating-coils located within the heater and connected with a source of heat-supply, and valves in said heating-coils, whereby any desired number of the coils may be cut out of circulation, substantially as described.

16. A food-curing plant, comprising, in communicating series, a preservative-generator, a cooler, and a curing-chamber, means constructed and arranged to remove the collected impurities from said cooler, means constructed to create a circulation of the preservative throughout the plant, and means constructed to permit escape of a portion of the preservative, substantially as described.

17. A food-curing plant, comprising a preservative-generator, a cooler, and a curing-chamber connected in communicating series by suitable flues, a by-pass connecting said cooler and the inlet-flue to the curing-chamber, and means constructed to cause a return circulation through said by-pass, substantially as described.

18. A food-curing plant, comprising a preservative-generator, a cooler, and a curing-chamber, connected in communicating series by suitable flues, an adjustable by-pass connecting said cooler and the inlet-flue of the